(12) United States Patent
Norman

(10) Patent No.: US 7,796,601 B1
(45) Date of Patent: Sep. 14, 2010

(54) INTERNET PROTOCOL DATA TRANSFER OVER DIVERSE PATHS

(75) Inventor: Charles William Norman, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 49 days.

(21) Appl. No.: 12/399,148

(22) Filed: Mar. 6, 2009

(51) Int. Cl.
  *H04L 12/56* (2006.01)
(52) U.S. Cl. ........................ 370/392; 370/254
(58) Field of Classification Search ........... 370/254, 370/401, 389, 349, 229, 395, 335, 232; 709/224
  See application file for complete search history.

(56) References Cited

U.S. PATENT DOCUMENTS

| | | | |
|---|---|---|---|
| 5,495,426 | A | 2/1996 | Waclawsky et al. |
| 6,580,715 | B1 | 6/2003 | Bare |
| 6,628,649 | B1 | 9/2003 | Raj et al. |
| 6,947,379 | B1 | 9/2005 | Gleichauf et al. |
| 7,061,891 | B1 * | 6/2006 | Kilfoyle et al. ............. 370/335 |
| 7,180,897 | B1 * | 2/2007 | Proctor .................... 370/395.1 |
| 7,420,962 | B2 * | 9/2008 | Das et al. .................... 370/352 |
| 7,512,138 | B2 * | 3/2009 | Horoschak et al. .......... 370/401 |
| 7,586,894 | B2 * | 9/2009 | Aoki et al. .................. 370/349 |
| 7,684,395 | B2 * | 3/2010 | Kimura et al. ............... 370/389 |
| 2003/0107991 | A1 * | 6/2003 | Tezuka et al. ................ 370/229 |
| 2007/0008884 | A1 * | 1/2007 | Tang .......................... 370/230 |
| 2007/0133552 | A1 * | 6/2007 | Kubo et al. ............. 370/395.2 |
| 2007/0201455 | A1 * | 8/2007 | Totzke ........................ 370/356 |
| 2008/0002723 | A1 * | 1/2008 | Pusateri ..................... 370/401 |
| 2008/0062891 | A1 * | 3/2008 | Van der Merwe et al. ... 370/254 |
| 2009/0077226 | A1 * | 3/2009 | Lee et al. .................... 709/224 |
| 2009/0310485 | A1 * | 12/2009 | Averi et al. ................. 370/232 |
| 2010/0091650 | A1 * | 4/2010 | Brewer et al. ............... 370/229 |

* cited by examiner

*Primary Examiner*—Thong H Vu

(57) ABSTRACT

A network transfers a first packet addressed to a first address and indicating a second address. The network routes the first packet through a first set of routers. The first routers transfer route priority messages indicating the second address to directly linked routers to lower their route priority to the first routers for the second address. The network transfers a second packet addressed to the second address and indicating the first address. The network routes the second packet through a second set of routers. The second routers transfer route priority messages indicating the first address to directly linked routers to lower their route priority to the second routers for the first address. The network routes a first packet flow addressed to the first address through the first routers and routes a second packet flow addressed to the second address through the second routers.

20 Claims, 10 Drawing Sheets

INTERNET PROTOCOL DATA TRANSFER OVER DIVERSE PATHS

TECHNICAL BACKGROUND

An Internet Protocol (IP) network routes an IP packet based on an IP address in the packet. A router in the IP network typically enters an internal routing table with the IP address to yield a prioritized list of links to other routers or nodes. The router then transfers the packet over the highest priority link in the list. In some cases, a first router will instruct a second router to lower its route priority to the first router for a given IP address. When the second router enters its internal routing table with the given IP address, it will probably not select the lowered priority link to the first router.

If the IP network uses a Transmission Control Protocol (TCP), then the routers send acknowledgements back along the packet path if the IP packet correctly reaches its TCP destination. If the IP network uses a User Datagram Protocol (UDP), no such acknowledgements are sent back. The IP network may also transfer packets over different routes. This can be accomplished by establishing two IP tunnels that use different IP routing, so they traverse physically separate routes.

OVERVIEW

A network transfers a first packet addressed to a first address and indicating a second address. The network routes the first packet through a first set of routers. The first set of routers transfer route priority messages indicating the second address to other directly linked routers to lower their route priority to the first set of routers for the second address. The network transfers a second packet addressed to the second address and indicating the first address. The network routes the second packet through a second set of routers. The second set of routers transfer route priority messages indicating the first address to other directly linked routers to lower their route priority to the second set of the routers for the first address. The network routes a first packet flow addressed to the first address through the first set of routers and routes a second packet flow addressed to the second address through the second set of routers. The network inhibits routing of the first packet flow to the second set of routers and inhibits the routing of the second packet flow to the first set of routers based on the lowered route priorities.

DETAILED DESCRIPTION

In the following description, an Internet Protocol (IP) router network initiates two IP packet flows between an origination node and a destination node. Each of the IP packet flows is insulated from the other by dynamically modifying routing priorities, so the routers handling one packet flow are unlikely to handle the other packet flow. This flow insulation provides better reliability and speed if a link failure occurs. The two packet flows may carry user data, such as voice or video. The two packet flows may carry redundant user data or separated user data that is subsequently merged.

Figure 1:
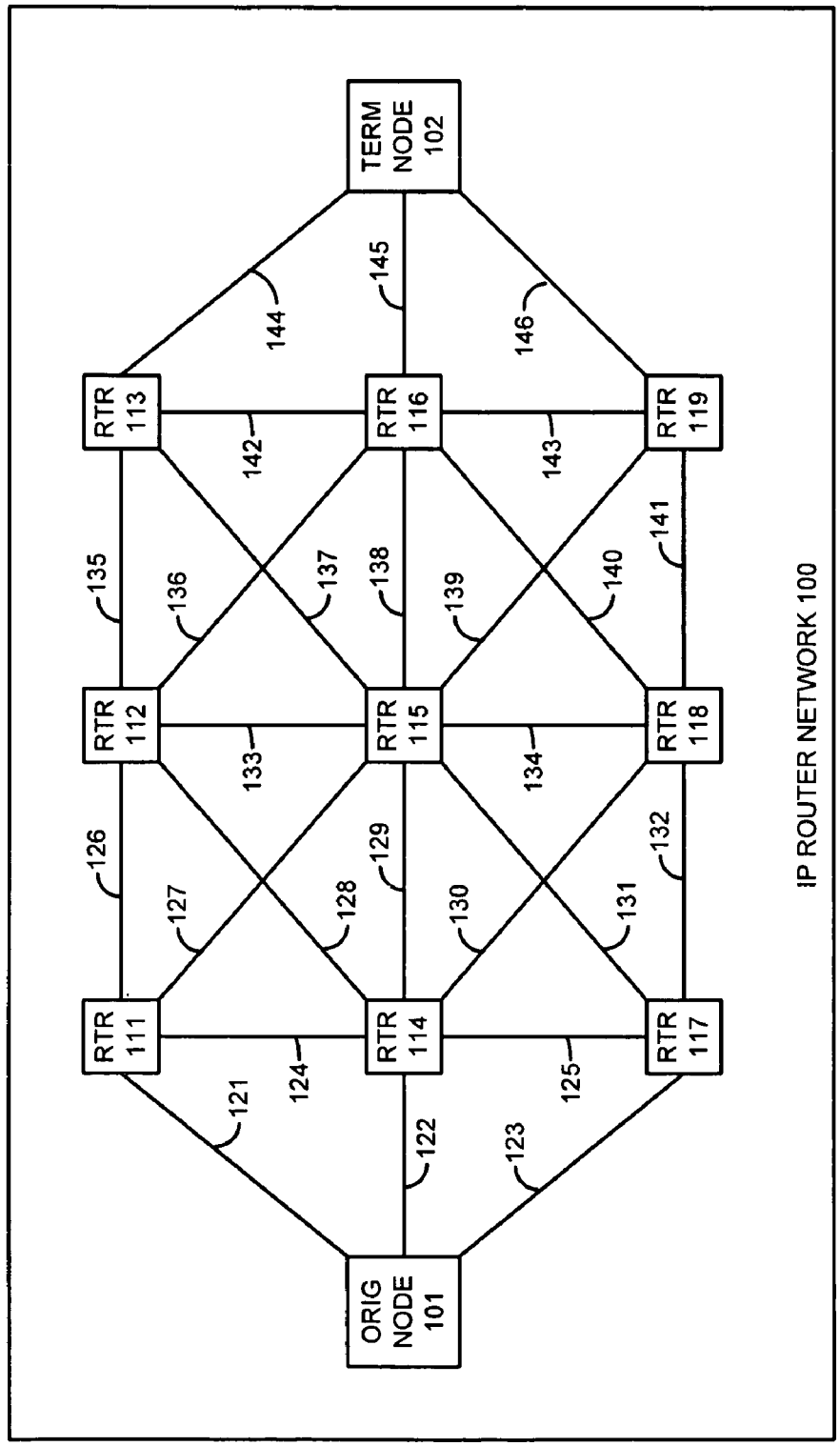
FIG. 1 illustrates an IP router network.

FIG. 1 illustrates IP router network 100. IP router network 100 comprises originating node 101 and terminating node 102 that are coupled by IP routers 111-119 and links 121-146. Originating node 101 communicates with routers 111, 114, and 117 over respective links 121-123. Terminating node 102 communicates with routers 113, 116, and 119 over respective links 144-146. Router 111 communicates with node 101 and routers 112, 114, and 115 over respective links 121, 126, 124, and 127. Router 112 communicates with routers 111, 113, 114, 115, and 116 over respective links 126, 135, 128, 133, and 136. Router 113 communicates with node 102 and routers 112, 115, and 116 over respective links 144, 135, 137, and 142. Router 114 communicates with node 101 and routers 111, 112, 115, 117, and 118 over respective links 122, 124, 128, 129, 125, and 130. Router 115 communicates with routers 111, 112, 113, 114, 116, 117, 118, and 119 over respective links 127, 133, 137, 129, 138, 131, 134, and 139. Router 116 communicates with node 102 and routers 112, 113, 115, 118, and 119 over respective links 145, 136, 142, 138, 140, and 143. Router 117 communicates with node 101 and routers 114, 115, and 118 over respective links 123, 125, 131, and 132. Router 118 communicates with routers 114, 115, 116, 117, and 119 over respective links 130, 134, 140, 132, and 141. Router 119 communicates with node 102 and routers 115, 116, and 118 over respective links 146, 139, 143, and 141.

Nodes 101-102 comprise routers, base stations, servers, user communication devices, gateways, switches, data processing systems, or some other type of IP processing system—including combinations thereof. Routers 111-119 comprise IP packet processing systems that route IP packets based on packet addressing and internal routing tables. Links 121-146 may use various communication media, such as air, metal, optical fiber, or some other signal propagation path—including combinations thereof. In addition to IP, links 121-146 may use various other protocols, such as telephony, time division multiplex, Ethernet, optical networking, wireless communication, code division multiple access, worldwide interoperability for microwave access, global system for mobile communication, long term evolution, or some other communication format—including combinations thereof.

Figure 2:
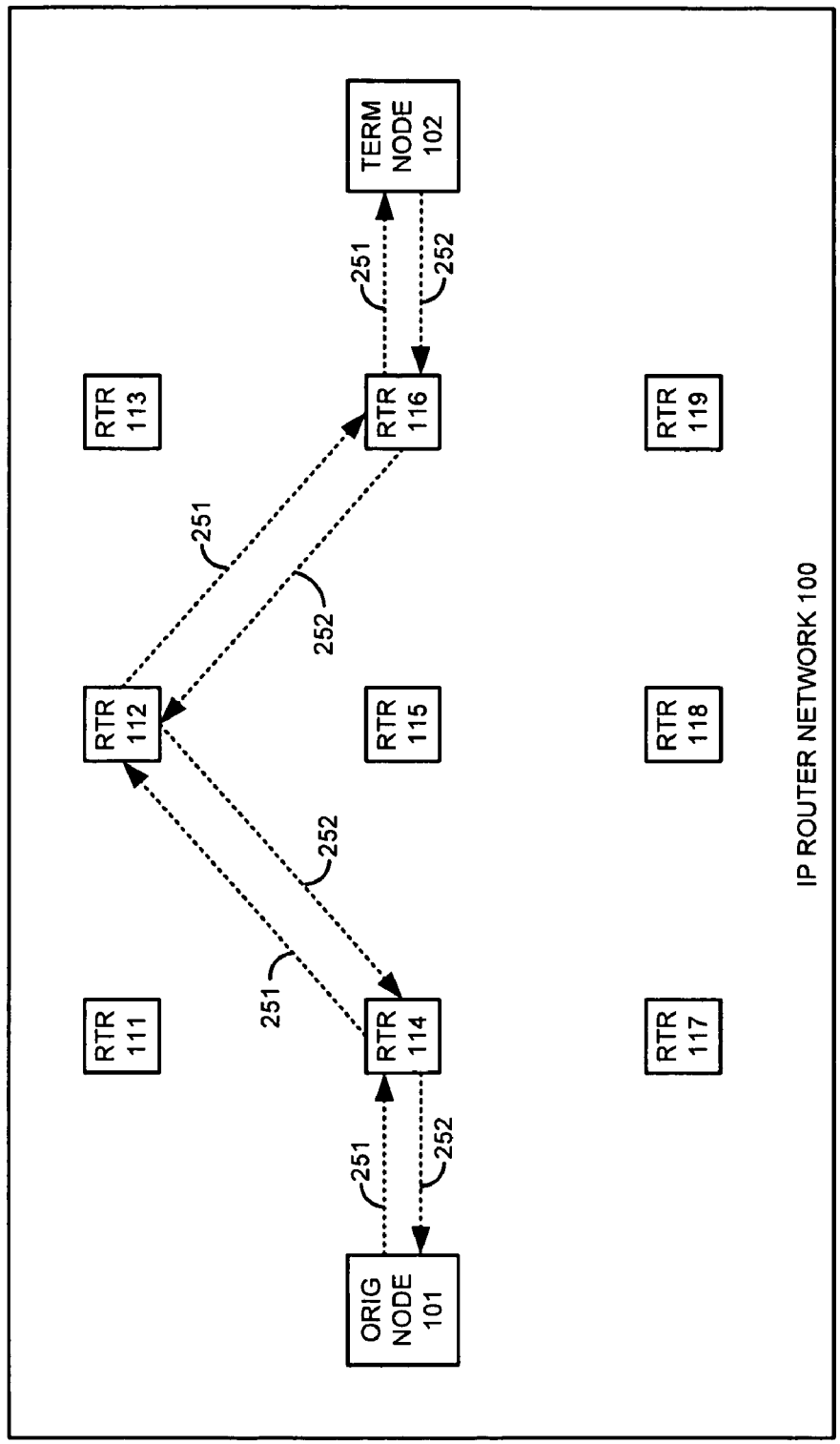
FIG. 2 illustrates the operation of the IP router network.

FIG. 2 illustrates the operation of IP router network 100. For clarity, the links shown on FIG. 1 have been left off of FIG. 2. Originating node 101 transfers packet 251 to router 114. Packet 251 is a Transmission Control Protocol (TCP)/IP packet that is addressed to a first IP address and that identifies a second IP address. The first and second IP addresses could be different IP addresses or have different port numbers. TCP/IP packet 251 also indicates the procedure to be followed as described below. Router 114 routes TCP/IP packet 251 to router 112 based on the first IP address. Router 112 routes TCP/IP packet 251 to router 116 based on the first IP address. Router 116 routes TCP/IP packet 251 to terminating node 102 based on the first IP address.

In response to receiving TCP/IP packet 251, terminating node 102 transfers TCP acknowledgement message 252 back to router 116. Router 116 transfers TCP acknowledgement message 252 back to router 112. Router 112 transfers TCP acknowledgement 252 message back to router 114. Router 114 transfers TCP acknowledgement message 252 back to origination node 101.

Figure 3:
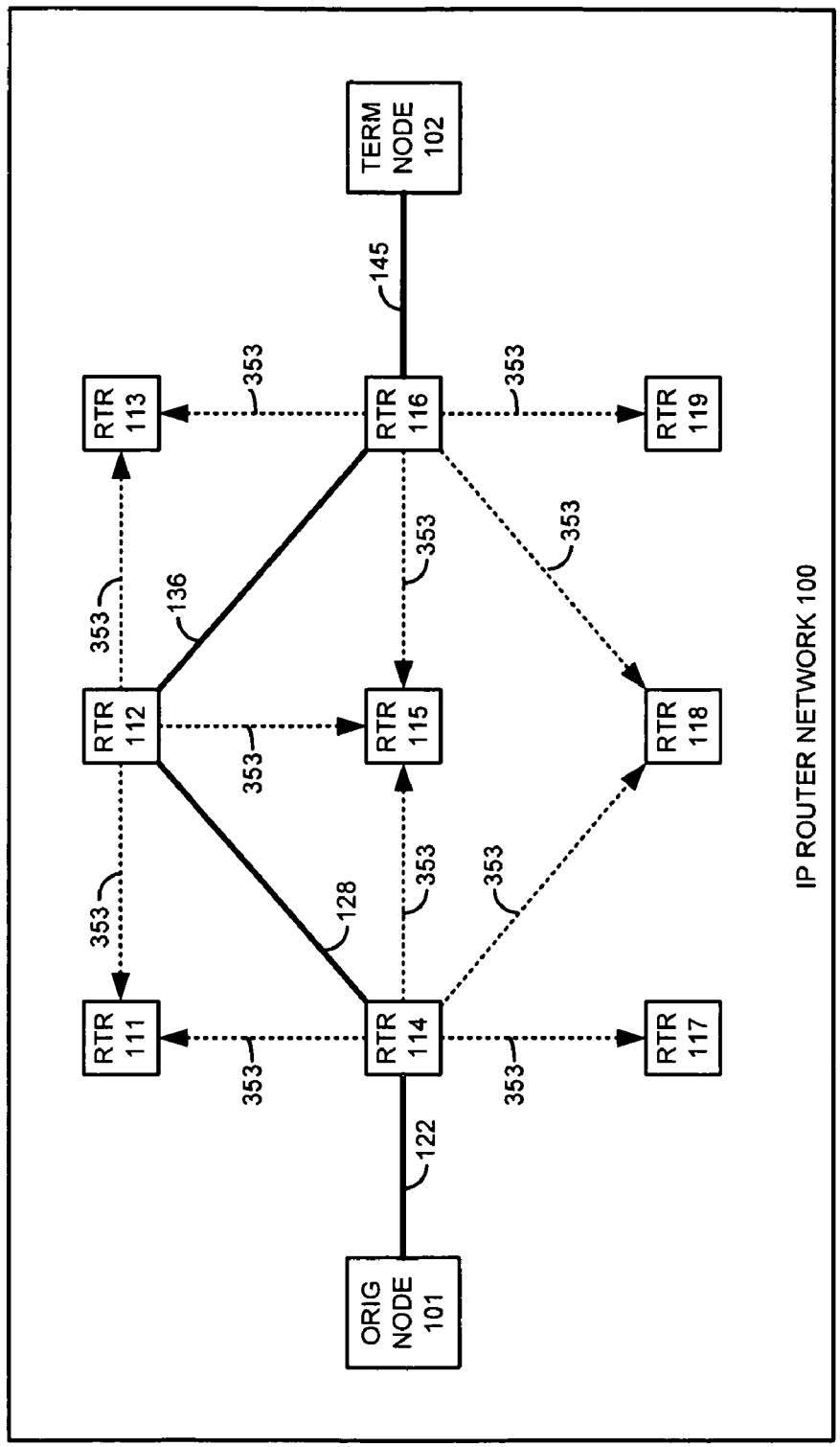
FIG. 3 illustrates the operation of the IP router network.

FIG. 3 illustrates the operation of IP router network 100. For clarity, the links shown on FIG. 1 have been left off of FIG. 3. In response to TCP acknowledgement message 252 and instructions in packet 251, router 116 transfers route priority messages 353 to routers 113, 115, 118, and 119. Router 116 selects routers 113, 115, 118, and 119, because they are directly linked to router 116 but they are not on the route for IP packet 251 (as are terminating node 102 and router 112). Route priority messages 353 indicate the second IP address and an instruction for routers 113, 115, 118, and 119 to lower their route priority to router 116 for the second IP address. For example, router 119 would make router 116 a low route priority for the second IP address. Thus, if router 119 receives a packet in the second packet flow addressed to the second IP address from router 115, then router 119 would select terminating node 102 or router 118 before selecting lower priority router 116. IP route table weight listing could be used to implement this process.

In response to TCP acknowledgement message 252 and instructions in packet 251, router 112 transfers route priority messages 353 to routers 111, 113, and 115. Router 112 selects routers 111, 113, and 115, because they are directly linked to router 112, but they are not on the route for IP packet 251 (as are routers 114 and 116). Route priority messages 353 indicate the second IP address and an instruction for routers 111, 113, and 115 to lower their route priority to router 112 for the second IP address.

In response to TCP acknowledgement message 252 and instructions in packet 251, router 114 transfers route priority messages 353 to routers 111, 115, 117, and 118. Router 114 selects routers 111, 115, 117, and 118, because they are directly linked to router 114, but they are not on the route for IP packet 251 (as are originating node 101 and router 112). Route priority messages 353 indicate the second IP address and an instruction for routers 111, 115, 117, and 118 to lower their route priority to router 114 for the second IP address.

Figure 4:
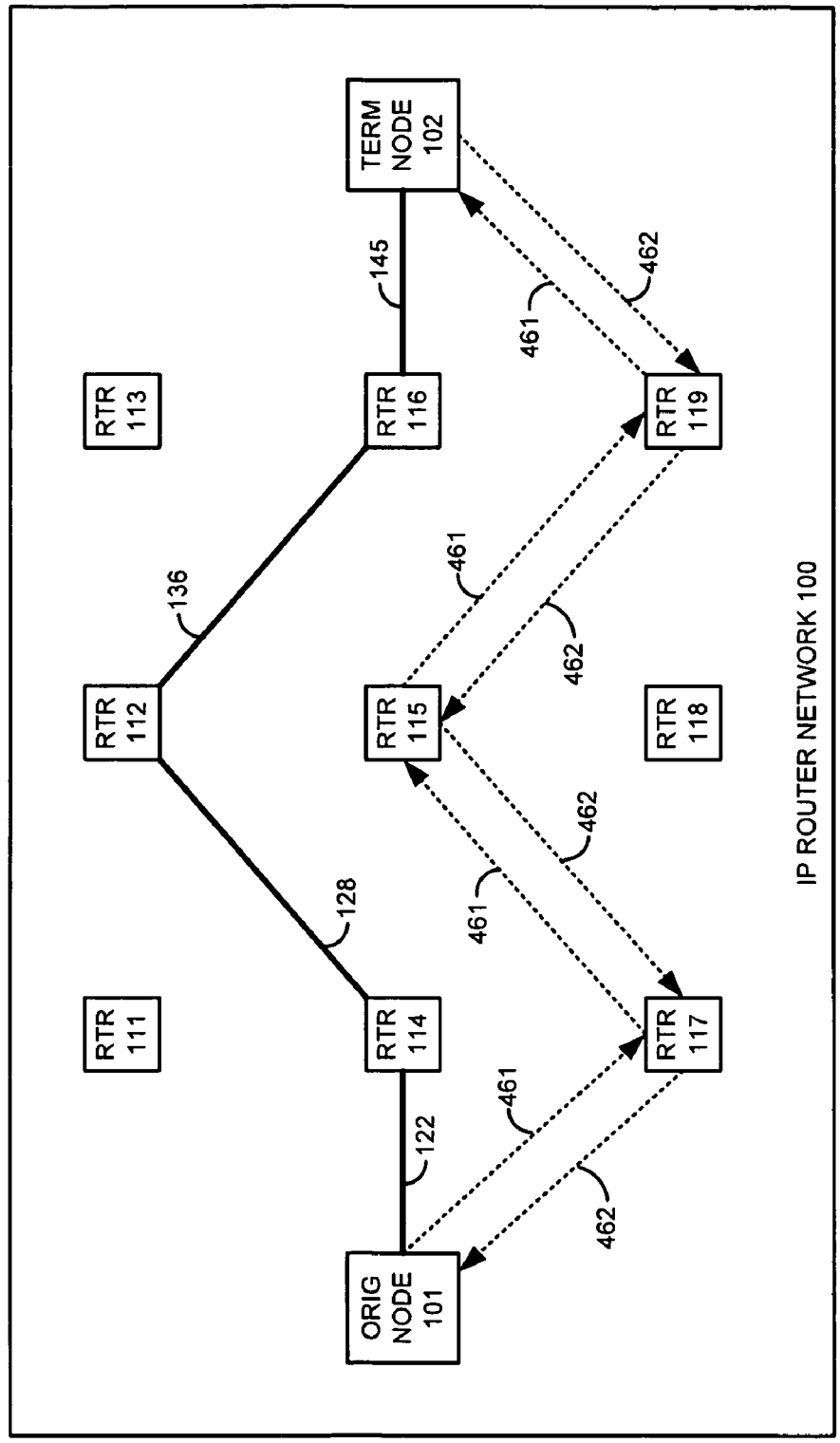
FIG. 4 illustrates the operation of the IP router network.

FIG. 4 illustrates the operation of IP router network 100. For clarity, most of the links shown on FIG. 1 have been left off of FIG. 4, except for links 122, 128, 136, and 145 that comprise the path for the first packet flow using the first IP address. Originating node 101 transfers packet 461 to router 117. Packet 461 is a TCP/IP packet that is addressed to the second IP address and that identifies the first IP address. TCP/IP packet 461 also indicates the procedure to be followed as described below. Router 117 routes TCP/IP packet 461 to router 115 based on the second IP address. Note that router 117 avoids routing packet 461 to router 114 responsive to route priority message 353. Router 115 routes TCP/IP packet 461 to router 119 based on the second IP address. Note that router 115 avoids routing packet 461 to routers 112, 114, and 116 responsive to route priority messages 353. Router 119 routes TCP/IP packet 461 to terminating node 102 based on the second IP address. Note that router 119 avoids routing packet 461 to router 116 responsive to route priority message 353.

In response to receiving TCP/IP packet 461, terminating node 102 transfers TCP acknowledgement message 462 back to router 119. Router 119 transfers TCP acknowledgement message 462 back to router 115. Router 115 transfers TCP acknowledgement 462 message back to router 117. Router 117 transfers TCP acknowledgement message 462 back to origination node 101.

Figure 5:
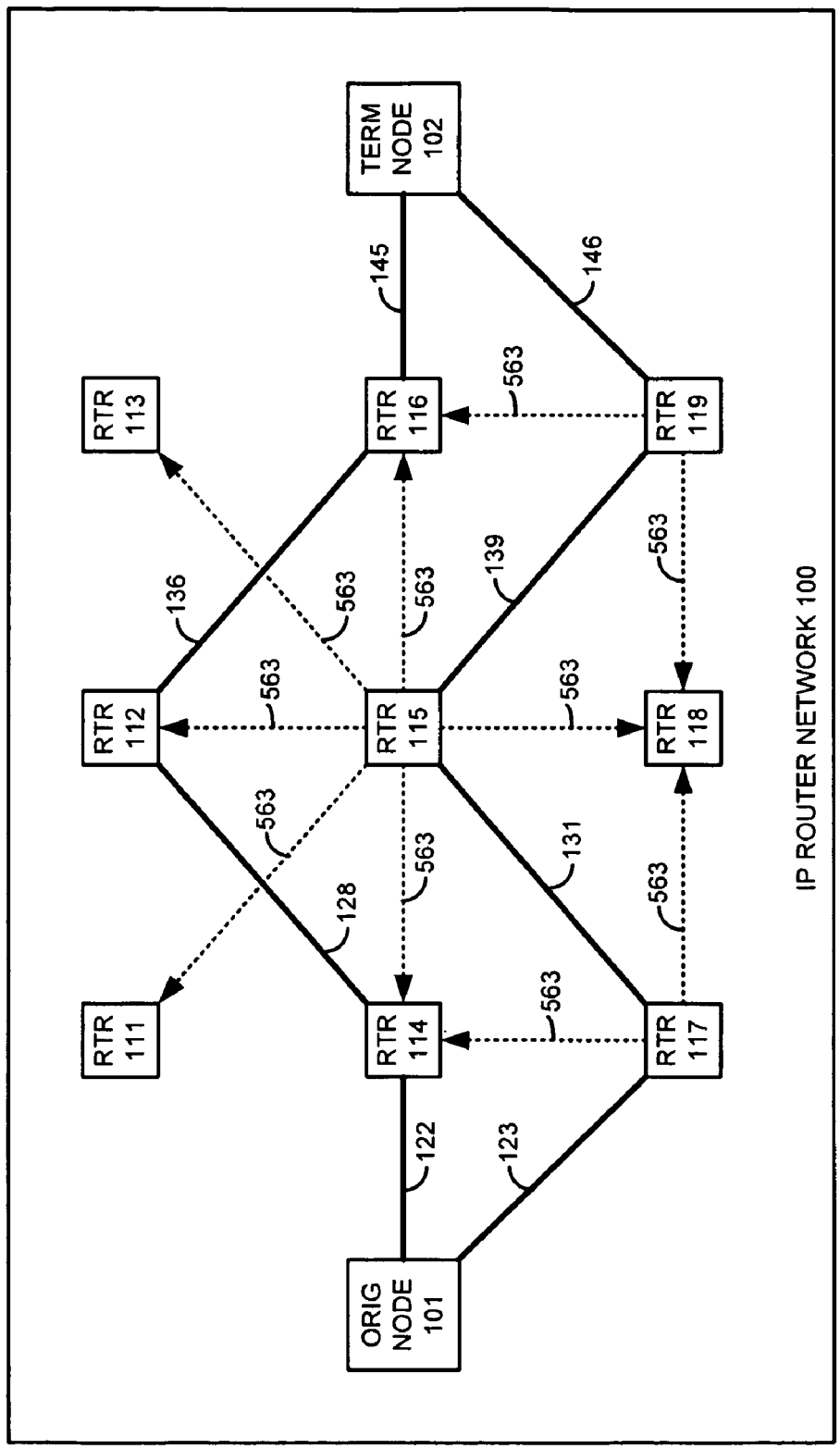
FIG. 5 illustrates the operation of the IP router network.

FIG. 5 illustrates the operation of IP router network 100. For clarity, some of the links shown on FIG. 1 have been left off of FIG. 5, except for links 122, 128, 136, and 145 that comprise the path for the first packet flow using the first IP address, and except for links 123, 131, 139, and 146 that comprise the path for the second packet flow using the second IP address. In response to TCP acknowledgement message 462 and instructions in packet 461, router 119 transfers route priority messages 563 to routers 116 and 118. Router 119 selects routers 116 and 118 because they are directly linked to router 119, but they are not on the route for IP packet 461 (as are terminating node 102 and router 115). Route priority messages 563 indicate the first IP address and an instruction for routers 116 and 118 to lower their route priority to router 119 for the first IP address. For example, router 116 would make router 119 a low route priority for the first IP address. Thus, when router 116 receives a packet in the first packet flow addressed to the first IP address from router 112, router 116 would select terminating node 102, router 113, or router 118 before selecting lower priority router 119. IP route table weight listing could be used to implement this process.

In response to TCP acknowledgement message 462 and instructions in packet 461, router 115 transfers route priority messages 563 to routers 111, 112, 113, 114, 116, and 118. Router 112 selects routers 111, 112, 113, 114, 116, and 118, because they are directly linked to router 115, but they are not on the route for IP packet 461 (as are routers 117 and 119). Route priority messages 563 indicate the first IP address and an instruction for routers 111, 112, 113, 114, 116, and 118 to lower their route priority to router 115 for the first IP address.

In response to TCP acknowledgement message 462 and instructions in packet 461, router 117 transfers route priority messages 563 to routers 114 and 118. Router 117 selects routers 114 and 118, because they are directly linked to router 117, but they are not on the route for IP packet 461 (as are originating node 101 and router 115). Route priority messages 563 indicate the first IP address and an instruction for routers 114 and 118 to lower their route priority to router 117 for the first IP address.

Figure 6:
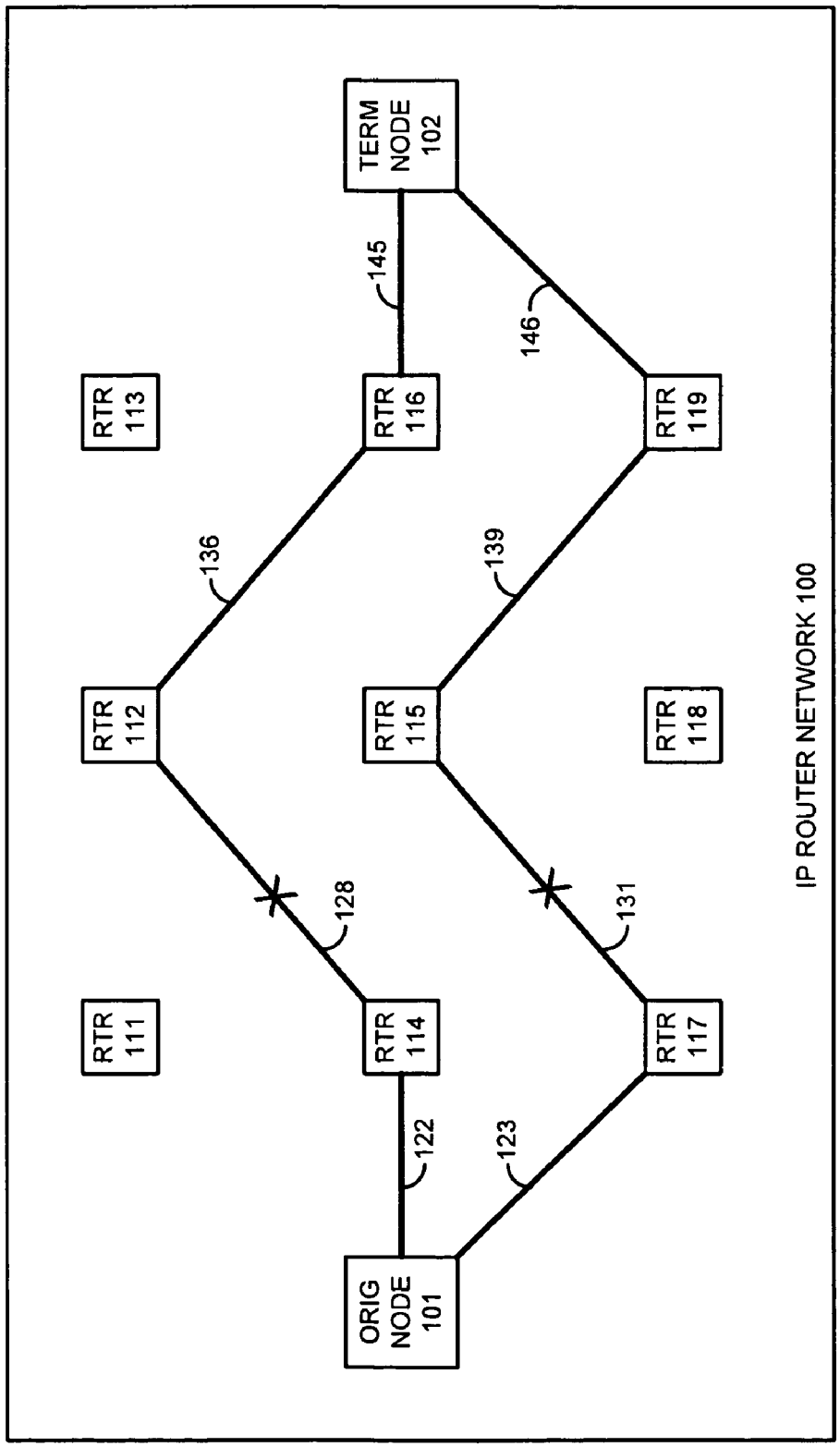
FIG. 6 illustrates the operation of the IP router network.

FIG. 6 illustrates the operation of IP router network 100. For clarity, some of the links shown on FIG. 1 have been omitted. In the above discussion TCP packet 251 and acknowledgement messages 252 established the first path for the first packet flow from origination node 101 to termination node 102 that would typically traverse links 122, 128, 136, and 145. Likewise, TCP packet 461 and acknowledgement messages 462 established the second path for the second packet flow from origination node 101 to termination node 102 that would typically traverse links 123, 131, 139, and 146. In response to acknowledgement message 462 for the second packet flow, origination node 101 begins to transfer user traffic in the first packet flow over link 122 to router 114, where the first packet flow comprises User Datagram Protocol (UDP)/IP packets having the first IP address as the destination address. These first UDP/IP packets typically follow links 122, 128, 136, and 145. Also in response to acknowledgement message 462 for the second packet flow, origination node 101 begins to transfer user traffic in the second packet flow over link 123 to router 117, where the second packet flow comprises UDP/IP packets having the second IP address as the destination address. These second UDP/IP packets typically follow links 123, 131, 139, and 146. Advantageously, the UDP packets do not require TCP-like acknowledgement message and typically provide faster delivery.

Although the first packet flow typically follows links 122, 128, 136, and 145, network 101 may still utilize IP re-routing if link congestion or some other failure occurs. For example, if link 128 fails (as indicated by the X mark), then router 114 will attempt to re-route the first packet flow. Because of route priority messages 563 from routers 115 and 117 for the first IP address, router 114 would probably not select routers 115 or 117 for the re-route since they have lowered route priorities for the first IP address. Instead router 114 would probably select router 111 or 118 for the re-route. Advantageously, the re-route of the first packet flow would try to avoid the path used by the second packet flow. In severe cases where no alternatives exist, however, the first packet flow could still use the path used by the second packet flow.

Although the second packet flow typically follows links 123, 131, 139, and 146, network 101 may still utilize IP re-routing if link congestion or some other failure occurs. For example, if link 131 fails (as indicated by the X mark), then router 117 will attempt to re-route the second packet flow. Because of route priority messages 353 from router 114 for the second IP address, router 117 would probably not select router 114 for the re-route since it has a lowered route priority for the second IP address. Instead router 117 would probably select router 118 for the re-route. Advantageously, the re-route of the second packet flow would try to avoid the path used by the first packet flow. In severe cases where no alternatives exist, however, the second packet flow could still use the path used by the first packet flow.

Originating node 101 could send redundant user traffic over the first and second packet flows if reliability is important, and terminating node 102 could use the redundant flows to recover traffic if any packets are lost. Alternatively, originating node 101 could separate user traffic into two sets if maximum bandwidth is important, and send the first set over the first packet flow and the second set over the second packet flow, where terminating node 102 would merge the separated traffic back together.

Figure 7:
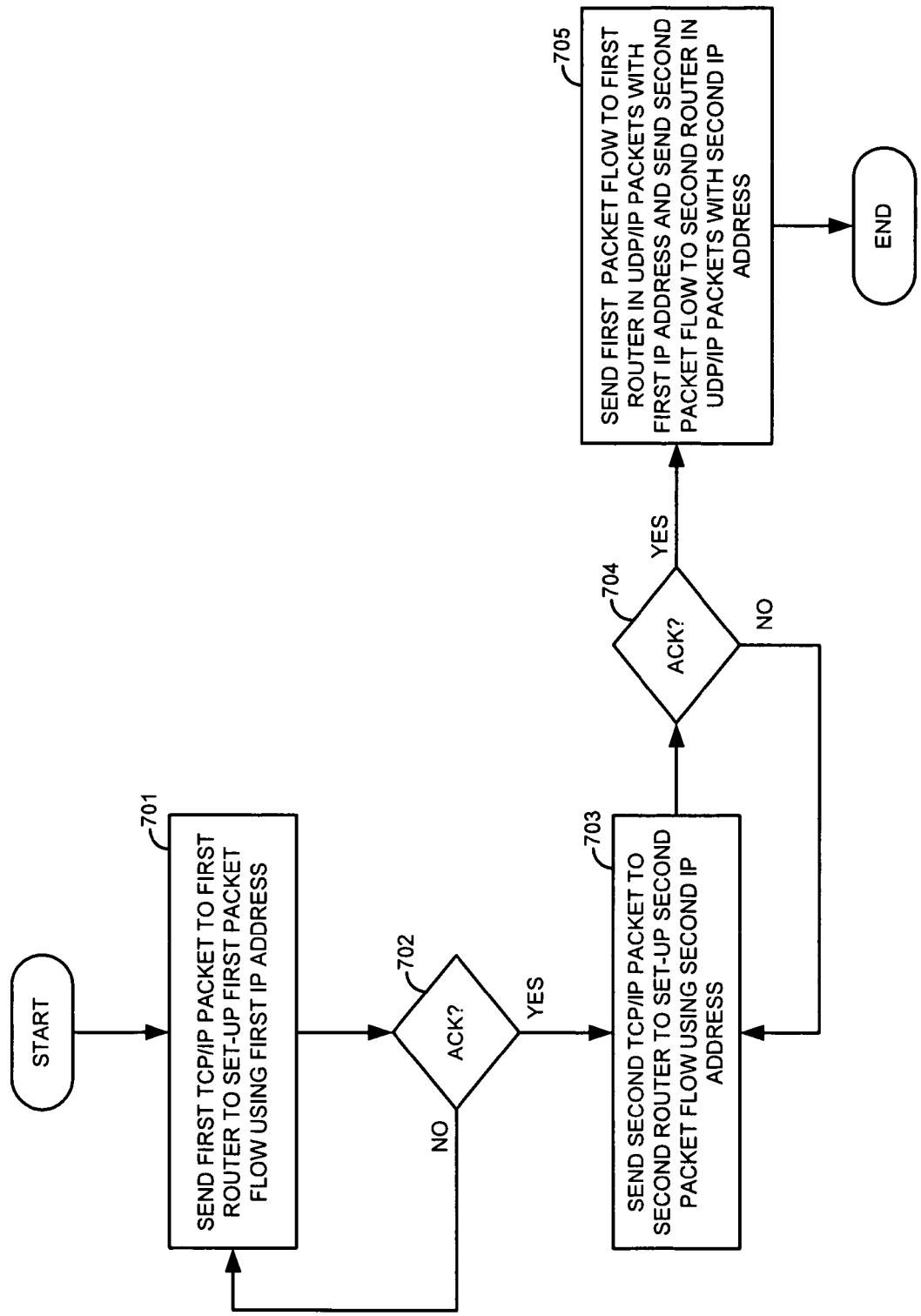
FIG. 7 illustrates the operation of an origination node.

FIG. 7 illustrates the operation of an originating node. The process starts when the origination node transfers a first TCP/IP packet to a first router to set up a first packet flow using the first IP address (701). The first packet identifies a second IP address and has instructions to initiate the process described above. If the originating node does not receive a TCP acknowledgement for the first packet (702), then the originating node resends the first packet. If the originating node does receive the TCP acknowledgement for the first packet (702), then the originating node transfers a second TCP/IP packet to a second router to set up a second packet flow using the second IP address (703). The second packet identifies the first IP address and has instructions to initiate the process described above. If the originating node does not receive a TCP acknowledgement for the second packet (704), then the originating node resends the second packet. If the originating node does receive the TCP acknowledgement for the second packet (704), then the originating node sends a first packet flow to the first router in UDP/IP packets with the first IP address, and the originating node sends a second packet flow to the second router in UDP/IP packets with the second IP address (705).

Figure 8:
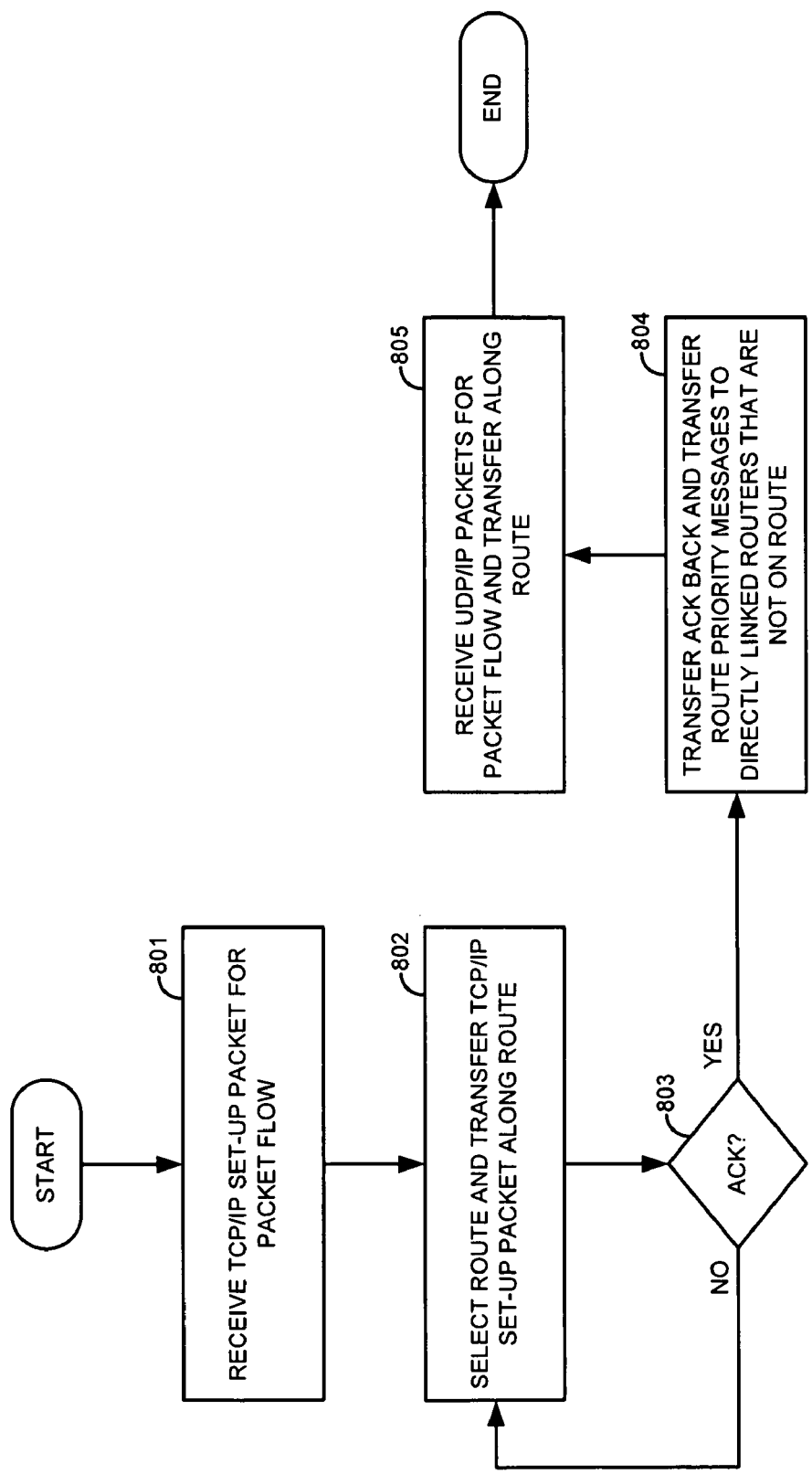
FIG. 8 illustrates the operation of an IP router.

FIG. 8 illustrates the operation of a router. The process starts when the router receives a first TCP/IP packet from a sending node or router to set up a first packet flow using a first IP address (801). The first packet identifies a second IP address and has instructions to initiate the process described above. The router processes the first IP address to select a route and transfers the first TCP/IP packet over the selected route to a receiving node or router (802). If the router does not receive a TCP acknowledgement for the first packet (803), then the router resends the first packet. If the router does receive the TCP acknowledgement for the first packet (803), then the router transfers a TCP/IP acknowledgement back to the sending node or router (804). The router also transfers route priority messages for the second IP address to all directly linked routers except for sending and receiving routers (804). The route priority messages cause the directly linked routers (except for sending and receiving routers) to lower the route priority of the router for the second IP address. Thus, it is unlikely that the directly linked routers would route packets having the second IP address to the router. This effectively reserves the router for the first packet flow and insulates the router from the second packet flow. The router receives UDP/IP packets for the first packet flow having the first IP address and routes the packets to the receiving node or router (805).

Figure 9:
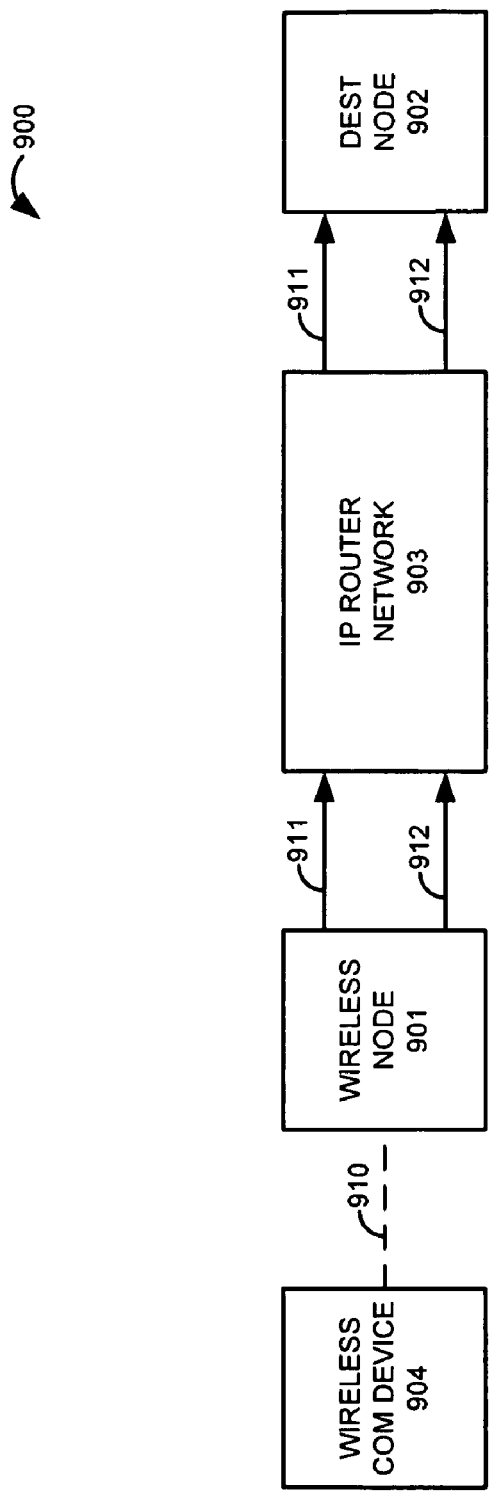
FIG. 9 illustrates an IP router network with a wireless node.

FIG. 9 illustrates communication system 900. Communication system 900 comprises wireless node 901, destination node 902, and IP router network 903. Wireless node 901 includes an antenna, signal processing circuitry, control processing circuitry, and IP network interface. Wireless node 901 could be a base station, transceiver, access point, gateway, IP router or some other type of wireless communication equipment—including combinations thereof. Wireless node 901 is configured and operates like origination node 101 described above. Destination node 902 is configured and operates like destination node 102 described above. IP router network 903 is configured and operates like IP router network 103 described above.

Wireless node 901 and wireless communication device 904 communicate over wireless link 910. Wireless communication device 904 comprises a telephone, wireless transceiver, computer, digital assistant, Internet appliance, or some other wireless communication apparatus—including combinations thereof. Wireless link 910 could use various protocols, such as wireless fidelity, code division multiple access, worldwide interoperability for microwave access, global system for mobile communication, long term evolution, or some other wireless communication format—including combinations thereof.

In operation, wireless communication device 904 wirelessly transfers user data to wireless node 901 over wireless link 910. Wireless node 901 initiates first and second IP flows 911-912 through IP router network 903 to destination node 902 as described above. Wireless node 901 then transfers the user data in the first and second IP flows 911-912 through IP router network 903 to destination node 902. In an alternative scenario (not shown), wireless communication device 904 could wirelessly initiate first and second IP flows 911-912 through wireless link 910, wireless node 901 to IP router network 903 and then destination node 902. Wireless communication device 904 would then transfer the user data in the first and second IP flows 911-912 through wireless link 910, wireless node 901, and IP router network 903 to destination node 902.

Figure 10:
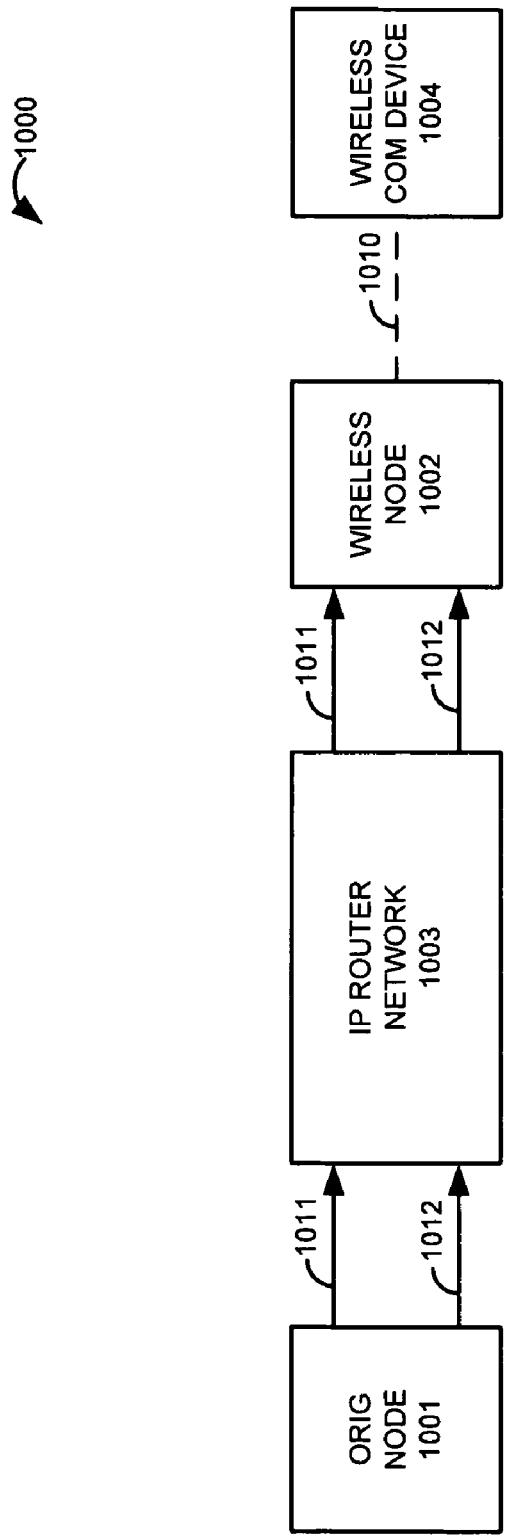
FIG. 10 illustrates an IP router network with a wireless node.

FIG. 10 illustrates communication system 1000. Communication system 1000 comprises origination node 1001, wireless node 1002, and IP router network 1003. Wireless node 1002 includes an antenna, signal processing circuitry, control processing circuitry, and IP network interface. Wireless node 1002 could be a base station, transceiver, access point, gateway, IP router or some other type of wireless communication equipment—including combinations thereof. Wireless node 1002 is configured and operates like destination node 102 described above. Origination node 1001 is configured and operates like origination node 101 described above. IP router network 1003 is configured and operates like IP router network 103 described above.

Wireless node 1002 and wireless communication device 1004 communicate over wireless link 1010. Wireless communication device 1004 comprises a telephone, wireless transceiver, computer, digital assistant, Internet appliance, or some other wireless communication apparatus—including combinations thereof. Wireless link 1010 could use various protocols, such as wireless fidelity, code division multiple access, worldwide interoperability for microwave access, global system for mobile communication, long term evolution, or some other wireless communication format—including combinations thereof.

In operation, origination node 1001 initiates first and second IP flows 1011-1012 through IP router network 1003 to wireless node 1002 as described above. Origination node 1001 then transfers user data in the first and second IP flows 1011-1012 through IP router network 1003 to wireless node 1002. Wireless node 1002 wirelessly transfers the user data to wireless communication device 1004 over wireless link 1010. In an alternative scenario (not shown), origination node 1001 could initiate first and second IP flows 1011-1012 through IP router network 1003, wireless node 1002, and wireless link 1010 to wireless communication device 1004 and then destination node 902. Origination node 1001 would then transfer the user data in the first and second IP flows 1011-1012 through IP router network 1003, wireless node 1002, and wireless link 1010 to wireless communication device 1004.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating an Internet Protocol (IP) network comprising a plurality of routers, the method comprising:
   transferring a first IP packet addressed to a first IP address and indicating a second IP address and routing the first IP packet through a first set of the routers based on the first IP address;
   in response to the first IP packet, transferring first route priority messages indicating the second IP address from the first set of the routers to other ones of the routers that are directly linked to the first set of the routers;
   in the other routers that are directly linked to the first set of the routers, lowering route priority to the first set of routers for the second IP address in response to the first route priority messages;
   transferring a second IP packet addressed to the second IP address and indicating the first IP address and routing the second IP packet through a second set of the routers based on the second IP address;
   in response to the second IP packet, transferring second route priority messages indicating the first IP address from the second set of the routers to other ones of the routers that are directly linked to the second set of the routers; and
   in the other routers that are directly linked to the second set of the routers, lowering route priority to the second set of the routers for the first IP address in response to the second route priority messages.

2. The method of claim 1 further comprising transferring a first IP packet flow addressed to the first IP address and routing the first IP packet flow through the first set of the routers based on the first IP address and inhibiting routing of the first IP packet flow to the second set of the routers based on the lower route priority to the second set of the routers for the first IP address.

3. The method of claim 2 further comprising transferring a second IP packet flow addressed to the second IP address and routing the second IP packet flow through the second set of the routers based on the second IP address and inhibiting routing of the second IP packet flow to the first set of the routers based on the lower route priority to the first set of the routers for the second IP address.

4. The method of claim 3 wherein the first IP packet comprises a Transmission Control Protocol (TCP)/IP packet and further comprising transferring first TCP acknowledgements back through the first set of the routers responsive to the first TCP/IP packet.

5. The method of claim 4 wherein transferring the second IP packet comprises transferring the second IP packet in response to the first TCP acknowledgements.

6. The method of claim 5 wherein the second IP packet comprises a TCP/IP packet and further comprising transferring second TCP acknowledgements back through the second set of the routers responsive to the second TCP/IP packet.

7. The method of claim 6 wherein the first IP packet flow comprises a first User Datagram Protocol (UDP)/IP packet flow and the second IP packet flow comprises a second UDP/IP packet flow and wherein transferring the first UDP/IP packet flow and the second UDP/IP packet flow comprises transferring the first UDP/IP packet flow and the second UDP/IP packet flow in response to the second TCP acknowledgements.

8. The method of claim 6 wherein transferring the first IP packet flow and the second IP packet flow comprises transferring the first IP packet flow and the second IP packet flow in response to the second TCP acknowledgements.

9. The method of claim 1 wherein the first IP packet flow and the second IP packet flow transport redundant data.

10. The method of claim 1 wherein the first IP packet flow and the second IP packet flow transport different portions of a data set and further comprising receiving the first IP packet flow and the second IP packet flow from the routers and merging the different portions into the data set.

11. The method of claim 1 wherein the first IP packet flow and the second IP packet flow transport different portions of a video and further comprising receiving the first IP packet flow and the second IP packet flow from the routers and merging the different portions into the video.

12. The method of claim 1 wherein the first IP packet flow and the second IP packet flow transport different portions of a voice message and further comprising receiving the first IP packet flow and the second IP packet flow from the routers and merging the different portions into the voice message.

13. The method of claim 1 wherein the first IP packet flow and the second IP packet flow transport video data.

14. The method of claim 1 wherein the first IP packet flow and the second IP packet flow transport voice data.

15. The method of claim 1 wherein the first IP address and the second IP address share address data but have different port numbers.

16. The method of claim 1 further comprising transferring a first IP packet flow addressed to the first IP address and routing the first IP packet flow through the first set of the routers to a destination node based on the first IP address and transferring a second IP packet flow addressed to the second IP address and routing the second IP packet flow through the second set of the routers to the destination node based on the second IP address.

17. The method of claim 1 further comprising receiving user data from a wireless communication device over a wireless link, transferring the user data in a first IP packet flow addressed to the first IP address and in a second IP packet flow addressed to the second IP address, routing the first packet flow through the first set of the routers to a destination node based on the first IP address, and routing the second packet flow through the second set of the routers to the destination node based on the second IP address.

18. The method of claim 1 further comprising transferring user data in a first IP packet flow addressed to the first IP address and in a second IP packet flow addressed to the second IP address, routing the first IP packet flow through the first set of the routers to a destination node based on the first IP address, routing the second IP packet flow through the second set of the routers to the destination node based on the second IP address, and transferring the user data from the destination node over a wireless link to a wireless communication device.

19. A method of operating an Internet Protocol (IP) network comprising a plurality of routers, the method comprising:
   transferring a first IP packet addressed to a first IP address and indicating a second IP address, routing the first IP packet through a first set of the routers based on the first IP address, and in response to the first IP packet, transferring first route priority messages indicating the second IP address from the first set of the routers to other ones of the routers that are directly linked to the first set of the routers;
   in the other routers that are directly linked to the first set of the routers, lowering route priority to the first set of routers for the second IP address in response to the first route priority messages;
   transferring a second IP packet addressed to the second IP address and indicating the first IP address, routing the second IP packet through a second set of the routers based on the second IP address, and in response to the second IP packet, transferring second route priority messages indicating the first IP address from the second set of the routers to other ones of the routers that are directly linked to the second set of the routers;
   in the other routers that are directly linked to the second set of the routers, lowering route priority to the second set of the routers for the first IP address in response to the second route priority messages;
   receiving user data from a wireless communication device over a wireless link, transferring the user data in a first IP packet flow addressed to the first IP address and in a second IP packet flow addressed to the second IP address, routing the first IP packet flow through the first set of the routers based on the first IP address and inhibiting routing of the first IP packet flow to the second set of the routers based on the lower route priority to the second set of the routers for the first IP address, and routing the second IP packet flow through the second set of the routers based on the second IP address and inhibiting routing of the second IP packet flow to the first set of the routers based on the lower route priority to the first set of the routers for the second IP address.

20. A method of operating an Internet Protocol (IP) network comprising a plurality of routers, the method comprising:
   transferring a first IP packet addressed to a first IP address and indicating a second IP address and routing the first IP packet through a first set of the routers based on the first IP address;
   in response to the first IP packet, transferring first route priority messages indicating the second IP address from the first set of the routers to other ones of the routers that are directly linked to the first set of the routers;
   in the other routers that are directly linked to the first set of the routers, lowering route priority to the first set of routers for the second IP address in response to the first route priority messages;
   transferring a second IP packet addressed to the second IP address and indicating the first IP address and routing the second IP packet through a second set of the routers based on the second IP address;
   in response to the second IP packet, transferring second route priority messages indicating the first IP address from the second set of the routers to other ones of the routers that are directly linked to the second set of the routers;
   in the other routers that are directly linked to the second set of the routers, lowering route priority to the second set of the routers for the first IP address in response to the second route priority messages;
   transferring user data in a first IP packet flow addressed to the first IP address and in a second IP packet flow addressed to the second IP address;
   routing the first IP packet flow through the first set of the routers to a destination node based on the first IP address and inhibiting routing of the first IP packet flow to the second set of the routers based on the lower route priority to the second set of the routers for the first IP address;
   routing the second IP packet flow through the second set of the routers to the destination node based on the second IP address and inhibiting routing of the second IP packet flow to the first set of the routers based on the lower route priority to the first set of the routers for the second IP address; and
   transferring the user data from the destination node to a wireless communication device over a wireless link.

* * * * *